United States Patent
Kojima et al.

(10) Patent No.: US 8,280,159 B2
(45) Date of Patent: Oct. 2, 2012

(54) METHODS AND DEVICES FOR COMPRESSING AN IMAGE

(75) Inventors: Shoji Kojima, Chino (JP); Kiyoharu Momose, Hata-machi (JP); Yoichiro Maki, Shiojiri (JP); Shinobu Tsukui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 908 days.

(21) Appl. No.: 12/328,544

(22) Filed: Dec. 4, 2008

(65) Prior Publication Data

US 2009/0154800 A1     Jun. 18, 2009

(30) Foreign Application Priority Data

Dec. 4, 2007  (JP) .................... 2007-313491

(51) Int. Cl.
*G06K 9/00* (2006.01)
*G06K 9/36* (2006.01)

(52) U.S. Cl. ...................................... 382/166

(58) Field of Classification Search ............ 382/162, 382/164–166, 173, 176, 181, 182, 190, 195, 382/199; 358/1.9, 1.11, 1.15, 1.18, 462, 358/488, 515, 518, 520, 530
See application file for complete search history.

(56) References Cited

U.S. PATENT DOCUMENTS

| | | | | |
|---|---|---|---|---|
| 7,733,534 B2* | 6/2010 | Murakami | | 358/3.13 |
| 2007/0253623 A1* | 11/2007 | Ohira et al. | | 382/218 |
| 2008/0069450 A1* | 3/2008 | Minami et al. | | 382/199 |
| 2009/0034005 A1* | 2/2009 | Gotoh | | 358/3.06 |
| 2009/0116738 A1* | 5/2009 | Kubota | | 382/165 |
| 2009/0154800 A1* | 6/2009 | Kojima et al. | | 382/165 |
| 2010/0027882 A1* | 2/2010 | Matsuoka | | 382/166 |
| 2010/0141991 A1* | 6/2010 | Yoshida et al. | | 358/1.15 |

FOREIGN PATENT DOCUMENTS

| | | |
|---|---|---|
| JP | 04-119768 A | 4/1992 |
| JP | 07-095578 A | 4/1995 |
| JP | 2002-247373 A | 8/2002 |
| JP | 2004-193818 A | 7/2004 |
| JP | 2006-246374 A | 9/2006 |

\* cited by examiner

*Primary Examiner* — Amir Alavi

(74) *Attorney, Agent, or Firm* — Kilpatrick Townsend & Stockton LLP

(57) ABSTRACT

An image processing device that processes input image data includes: an image dividing unit that divides the input image data into a plurality of blocks; an image type determining unit that determines the type of the input image data for every block on the basis of the number of edge elements included in the block; a frequency component conversion unit that converts color components of the input image data into frequency components for every block; and an image compression unit that compresses corresponding image data for every block by specifying unnecessary components of the converted frequency components of the image data on the basis of the determined type of the image data and suppressing or removing the specified unnecessary components.

20 Claims, 14 Drawing Sheets

FIG. 8

| y\x | 0 | 1 | 2 | 3 | 4 | 5 | 6 | 7 |
|---|---|---|---|---|---|---|---|---|
| 0 | 1 | 1 | 0 | 0 | 0 | 0 | 0 | 0 |
| 1 | 1 | 1 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

FIG. 9

| y\x | 0 | 1 | 2 | 3 | 4 | 5 | 6 | 7 |
|---|---|---|---|---|---|---|---|---|
| 0 | 1 | 1 | 1 | 1 | 0 | 0 | 0 | 0 |
| 1 | 1 | 1 | 1 | 1 | 0 | 0 | 0 | 0 |
| 2 | 1 | 1 | 1 | 1 | 0 | 0 | 0 | 0 |
| 3 | 1 | 1 | 1 | 1 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

FIG. 15

| PATTERN NUMBER N | THRESHOLD VALUE FOR MATCHING DETERMINATION Cref |
|---|---|
| 1 | 4 |
| 2 | 4 |
| 3 | 7 |
| 4 | 7 |
| 5 | 10 |
| 6 | 10 |
| 7 | 11 |
| 8 | 11 |
| 9 | 14 |
| 10 | 14 |
| 11 | 4 | abs(Cof[x][y]) BEFORE ADJUSTMENT abs(Cof[x][y]) AFTER ADJUSTMENT

METHODS AND DEVICES FOR COMPRESSING AN IMAGE

CROSS-REFERENCES TO RELATED APPLICATIONS

This application claims priority to Japanese Patent Application No. 2007-313491, filed Dec. 4, 2007, the disclosure of which is incorporated by reference herein.

BACKGROUND

1. Technical Field

The present invention relates to an image processing device that processes an image, an image forming apparatus having an image processing device, an image processing method, and a program causing a computer to execute each process of an image processing method.

2. Related Art

An image processing device that distinguishes characteristics of image data and compresses the image data in a compression format corresponding to the characteristic is proposed in the related art (for example, refer to JP-A-2004-193818). In this device, a high compression rate is realized while maintaining the image quality by counting edge components included in an image using a differential filter, determining whether or not the image is a text image or a natural image on the basis of the edge count value, and performing lossless compression processing based on a PNG method, a run length method, and the like when it is determined that the image is a text image and performing lossy compression processing based on a JPEG method when it is determined that the image is a natural image.

Thus, realizing a high compression rate while maintaining the image quality is very important in making the capacity of a memory, which stores image data, small or increasing the transmission speed at the time of transmission of image data. Accordingly, a further improvement in the processing method is desired.

SUMMARY

An advantage of some aspects of the invention is that it provides an image processing device, an image forming apparatus, an image processing method, and a program capable of increasing the compression rate of data while securing the image quality of input image data.

In order to achieve the advantage, an image processing device, an image forming apparatus, an image processing method, and a program according to some aspects of the invention are configured as follows.

According to an aspect of the invention, an image processing device that processes input image data includes: an image dividing unit that divides the input image data into a plurality of blocks; an image type determining unit that determines the type of the input image data for every block on the basis of the number of edge elements included in the block; a frequency component conversion unit that converts color components of the input image data into frequency components for every block; and an image compression unit that compresses corresponding image data for every block by specifying unnecessary components of the converted frequency components of the image data on the basis of the determined type of the image data and suppressing or removing the specified unnecessary components.

In the image processing device according to the aspect of the invention, the input image data is divided into a plurality of blocks, the type of the input image data is determined for every block on the basis of the number of edge elements included in the block, color components of the input image data are converted into frequency components for every block, and the image data is compressed for every block by specifying unnecessary components of the converted frequency components of the image data on the basis of the determined type of the image data and suppressing or removing the specified unnecessary components. Accordingly, the compression rate of image data can be raised while maintaining the image quality regardless of the type of image data. In addition, processing can be simplified since it is sufficient only to change unnecessary components among frequency components of image data according to the type of the image data.

In the image processing device according to the aspect of the invention configured as described above, the image type determining unit may be a unit that determines the type of the image data on the basis of the number of edge elements included in the block such that at least two of whether or not the number of monochrome edge elements corresponds to a monochrome text within a predetermined range, whether or not the number of color edge elements corresponds to a color text within a predetermined range, whether or not the edge elements are a large number of complex data regardless of monochrome or color, and whether or not the edge elements are a small number of image data are distinguishable.

In the image processing device according to the aspect of the invention that determines the type of image data such that text can be distinguished, an edge direction determining unit that determines a direction of the edge element detected when the image type determining unit determines that the type of the image data is a text may be further included, and the image compression unit may be a unit that specifies the unnecessary components on the basis of the determined direction of the edge element. In this way, the compression rate can be further raised while maintaining the image quality of a text. Here, the 'edge direction determining unit' includes a unit that determines the direction of the edge element using pattern matching. In the image processing device according to the aspect of the invention, the image compression unit may be a unit that specifies components other than frequency components distributed corresponding to the determined direction of the edge element as the unnecessary components. Furthermore, in the image processing device according to the aspect of the invention, the image compression unit may be a unit that adjusts a component value to a small value for a component, which has a component value equal to or larger than a threshold value, among the unnecessary components and adjusts a component value to a value 0 for a component, which has a component value less than the threshold value, among the unnecessary components. In this way, the image quality of a text can be further improved. In this case, the threshold value may be a value set on the basis of a difference between maximum and minimum values of the color components of the image data. This is based on the thought that a change in color components of image data is correlated with the size of a frequency component.

In the image processing device according to the aspect of the invention that determines the type of image data such that image data and complex data can be distinguished, the image compression unit may be a unit that specifies components in a high-frequency region equal to or larger than a predetermined frequency as the unnecessary components when the image data is determined to be the image data and specifies components in a high-frequency region equal to or larger than a frequency, which is higher than the predetermined frequency, as the unnecessary components when the image data is determined to be the complex data. In this way, the compression rate of image data having a small number of edge elements can be raised, and the compression rate of complex data having a large number of edge elements can also be raised while maintaining the image quality to some extent.

Furthermore, in the image processing device according to the aspect of the invention, the image type determining unit may be a unit that determines whether or not all pixels are white blank data, and the image compression unit may be a unit that converts the input image data into fixed data meaning a blank image and compresses the image data when the input image data is determined to be blank data. In this way, the compression rate of image data can be further raised.

Furthermore, in the image processing device according to the aspect of the invention, the image compression unit may be a unit that compresses the image data by sequentially performing quantization processing and coding processing after suppressing or removing the unnecessary components from the frequency components of the image data.

Furthermore, in the image processing device according to the aspect of the invention, the frequency component conversion unit may be a unit that converts the color components of the input image data into frequency components using discrete cosine transform (DCT), and the image compression unit may be a unit that compresses the image data by adjusting a DCT coefficient obtained by conversion into the frequency components. In this way, the image data can be compressed with simple processing.

According to another aspect of the invention, an image forming apparatus includes the image processing device described above, and an image is formed on a target using the image data compressed by the image compression unit.

In the image forming apparatus according to the aspect of the invention, the image processing device described above is included. Therefore, the same effects as those achieved by the image processing device described above, for example, an effect that the compression rate of data can be raised while maintaining the image quality regardless of the type of image data or an effect that processing can be simplified since it is sufficient only to change unnecessary components among frequency components of image data according to the type of the image data can be obtained.

According to still another aspect of the invention, an image processing method of processing input image data includes: dividing the input image data into a plurality of blocks; determining the type of the input image data for every block on the basis of the number of edge elements included in the block; converting color components of the input image data into frequency components for every block; and compressing corresponding image data for every block by specifying unnecessary components of the converted frequency components of the image data on the basis of the determined type of the image data and suppressing or removing the specified unnecessary components.

In the image processing method according to the aspect of the invention, the input image data is divided into a plurality of blocks, the type of the input image data is determined for every block on the basis of the number of edge elements included in the block, color components of the input image data are converted into frequency components for every block, and the image data is compressed for every block by specifying unnecessary components of the converted frequency components of the image data on the basis of the determined type of the image data and suppressing or removing the specified unnecessary components. Accordingly, the compression rate of image data can be raised while maintaining the image quality regardless of the type of image data. In addition, processing can be simplified since it is sufficient only to change unnecessary components among frequency components of image data according to the type of the image data.

According to still another aspect of the invention, there is provided a program causing one computer or a plurality of computers to execute each process of the image processing method described above. This program may be stored in computer-readable recording media (for example, a hard disk, a ROM, an FD, a CD, and a DVD), may be distributed from one computer to another computer through a transmission medium (communication network, such as Internet or LAN), or may be transmitted and received in other forms. Since each of the processes of the image processing method described above is executed when one computer is made to execute the program or a plurality of computers are made to share and execute the processes, the same operations and effects as the control method can be obtained.

BRIEF DESCRIPTION OF THE DRAWINGS

The invention will be described with reference to the accompanying drawings, wherein like numbers reference like elements.

FIG. 8 is an explanatory view illustrating an example of an image adjustment coefficient.

FIG. 9 is an explanatory view illustrating an example of a complex data adjustment coefficient.

FIG. 15 is an explanatory view illustrating the relationship between a pattern number and a threshold value for matching determination.

DESCRIPTION OF EXEMPLARY
EMBODIMENTS

Hereinafter, embodiments of the invention will be described with reference to the accompanying drawings. FIG.

Figure 1:
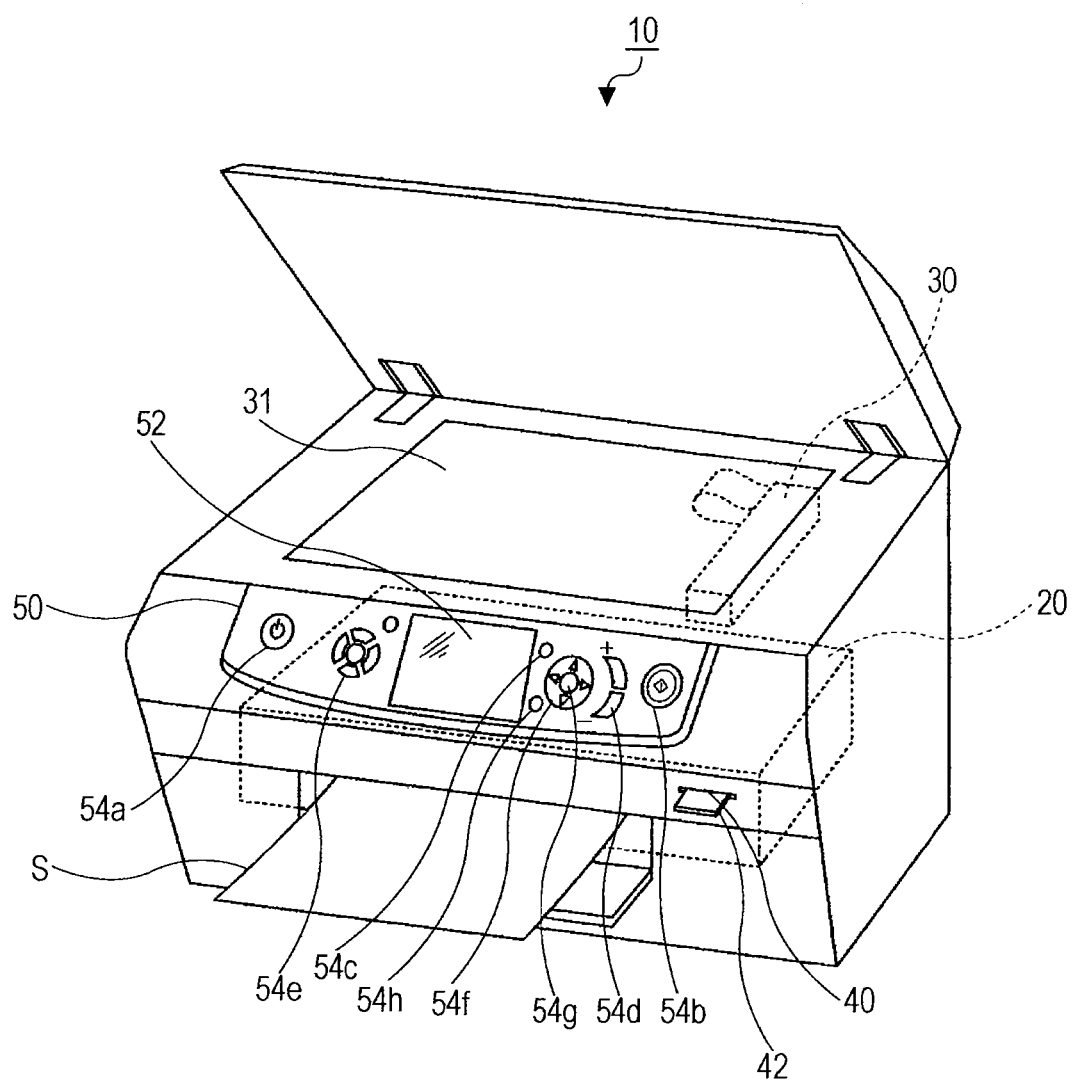
FIG. 1 is a view illustrating the configuration of a multi-function printer according to an embodiment.
Figure 2:
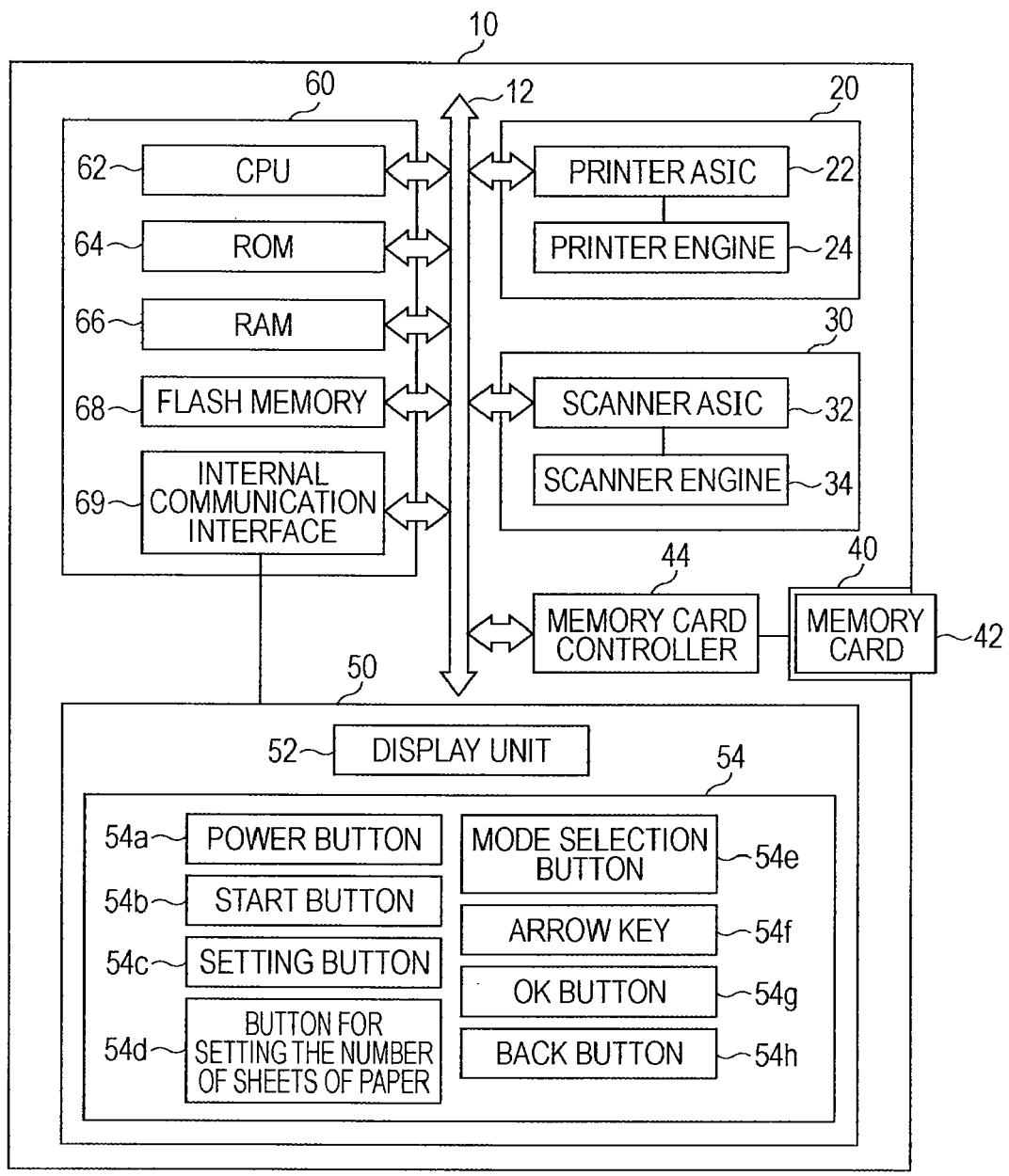
FIG. 2 is a block diagram illustrating the multifunction printer.

1 is a block diagram schematically illustrating the configuration of a multifunction printer 10, and FIG. 2 is a block diagram illustrating the multifunction printer 10.

As shown in the drawing, the multifunction printer 10 according to the present embodiment includes: a printer unit 20 that executes printing on paper S on the basis of a print job; a flat bed type scanner unit 30 that reads a document P placed on a document platen 31; a memory card controller 44 that manages input/output of data to/from a memory card 42 inserted in a memory card slot 40; an operator panel 50 that displays various kinds of information on a display unit 52 or inputs a user's instruction through an operation of buttons 54; and a main controller 60 that makes an overall control of the apparatus. The multifunction printer 10 is configured such that the printer unit 20 or the scanner unit 30, the memory card controller 44, and the main controller 60 can exchange various control signals or data through a bus 12.

The printer unit 20 includes a printer ASIC 22 and a printer engine 24. The printer ASIC 22 is an integrated circuit that controls the printer engine 24. When a print command is received from the main controller 60, the printer ASIC 22 controls the printer engine 24 to perform printing on the paper S on the basis of an image file that is a target of the print command. In addition, the printer engine 24 is formed by a color printer mechanism based on a known ink jet method in which printing is performed by discharging ink from a print head onto the paper. In addition, ASIC is the abbreviation for Application Specific Integrated Circuit.

The scanner unit 30 includes a scanner ASIC 32 and a scanner engine 34. The scanner ASIC 32 is an integrated circuit that controls the scanner engine 34. When a scanning command is received from the main controller 60, the scanner ASIC 32 controls the scanner engine 34 to read the document P placed on the document platen 31 as image data. In addition, the scanner engine 34 is formed by a known image scanner and includes a known color image sensor that divides reflected light, which is generated after light is emitted toward the document P, into colors of red (R), green (G), and blue (B), and uses the light components corresponding to the colors as scanning data. In the present embodiment, a CIS (contact image sensor) type sensor is used as a color image sensor.

The memory card controller 44 performs input and output of data between the memory card controller 44 and the memory card 42 inserted in the memory card slot 40 disposed beside the operator panel 50. When the memory card 42 is connected to the memory card slot 40, the memory card controller 44 reads a file stored in the memory card 42 and transmits the file to the main controller 60 or receives a command from the main controller 60 and writes data into the memory card 42 on the basis of the command.

The operator panel 50 includes the display unit 52 and the buttons 54. The display unit 52 is a liquid crystal display device, and various operation screens for performing selection and setting of a menu are displayed. In addition, the buttons 54 include: a power button 54a for turning on and off a power supply; a start button 54b for instructing the start of printing or copy; a setting button 54c for performing various kinds of print setting or copy setting; a button 54d for setting the number of sheets of paper that is used to set the number of sheets of paper or the number of copies to be printed with respect to a selected image; a mode selection button 54e for selecting various modes; an arrow key 54f with four directions for selecting various items or setting; an OK button 54g for making selected setting effective; and a back button 54h for returning to a previous screen. The buttons 54 enables a user's instruction to be input to the main controller 60 through an internal communication interface 69. Here, examples of a mode that can be selected by the mode selection button 54e include: a copy mode in which the document P set on the document platen 31 is scanned and copied, a memory card mode in which printing is performed by using an image stored in the memory card 42 or the document P is scanned to obtain data and the data is stored in the memory card 42, a film mode in which a photographic film is scanned and printed or data is stored in the memory card 42, and a CD/DVD drive mode in which an image in the CD/DVD is printed.

The main controller 60 is formed by a microprocessor having a CPU 62 as a main component and includes: a ROM 64 that stores various processing programs, various kinds of data, various tables, and the like; a RAM 66 that temporarily stores scan data or print data; a flash memory 68 that is electrically rewritable and stores data even if power is off; and an internal communication interface 69 that enables communication with the operator panel 50. These are connected to each other through the bus 12 so that signals can be exchanged therebetween. The main controller 60 receives various operation signals or various detection signals from the printer unit 20, the scanner unit 30, and the memory card controller 44 or receives an operation signal generated by the operation of the buttons 54 of the operator panel 50. In addition, the main controller 60 outputs to the memory card controller 44 a command that an image file be read from the memory card 42 and be output to the main controller 60, outputs to the printer unit 20 a command that printing of image data be executed, outputs to the scanner unit 30 a command that a document placed on the document platen 31 be read as image data on the basis of a scan command of the buttons 54 of the operator panel 50, or outputs a control command of the display unit 52 to the operator panel 50.

Figure 3:
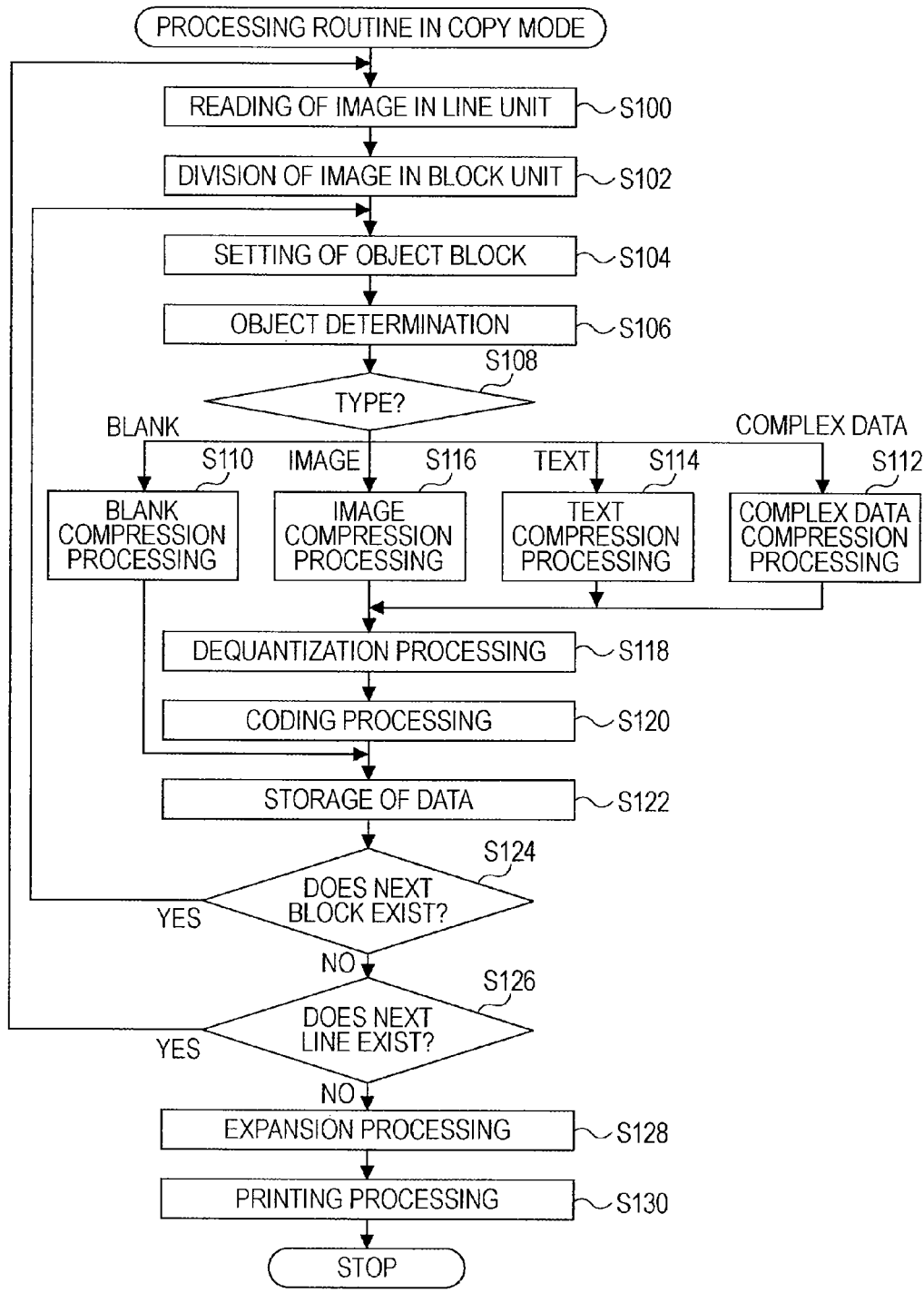
FIG. 3 is a flow chart illustrating an example of a processing routine in copy mode.

Next, an operation of the multifunction printer 10 according to the present embodiment, particularly an operation when the copy mode is selected will be described. FIG. 3 is a flow chart illustrating an example of a processing routine in the copy mode executed by the main controller 60. This processing is executed when the copy mode is selected by the mode selection button 54e and the OK button 54g is pressed in a state where the document P is set on the document platen 31. In addition, when the copy mode is selected by the mode selection button 54e, the main controller 60 displays a message, such as 'please set a document on the document platen and press the OK button', on the display unit 52.

When the processing routine in copy mode is executed, the CPU 62 of the main controller 60 first outputs a scan command to the scanner unit 30 so that the document P set on the document platen 31 is scanned and read in a line unit (step S100), and image data (RGB data) obtained by the reading is divided in a block unit (step S102). In an example, the division is performed such that one block is formed by 8×8 pixels. Then, an unprocessed block of the plurality of divided blocks is set to an object block (step S104), and an object determination for determining the type of the set object block is performed (step S106). This determination is performed by executing object determination processing illustrated in FIG. 4. Here, the explanation on the processing routine in copy mode is stopped, and the object determination processing of FIG. 4 will be described.

Figures 4, 5:
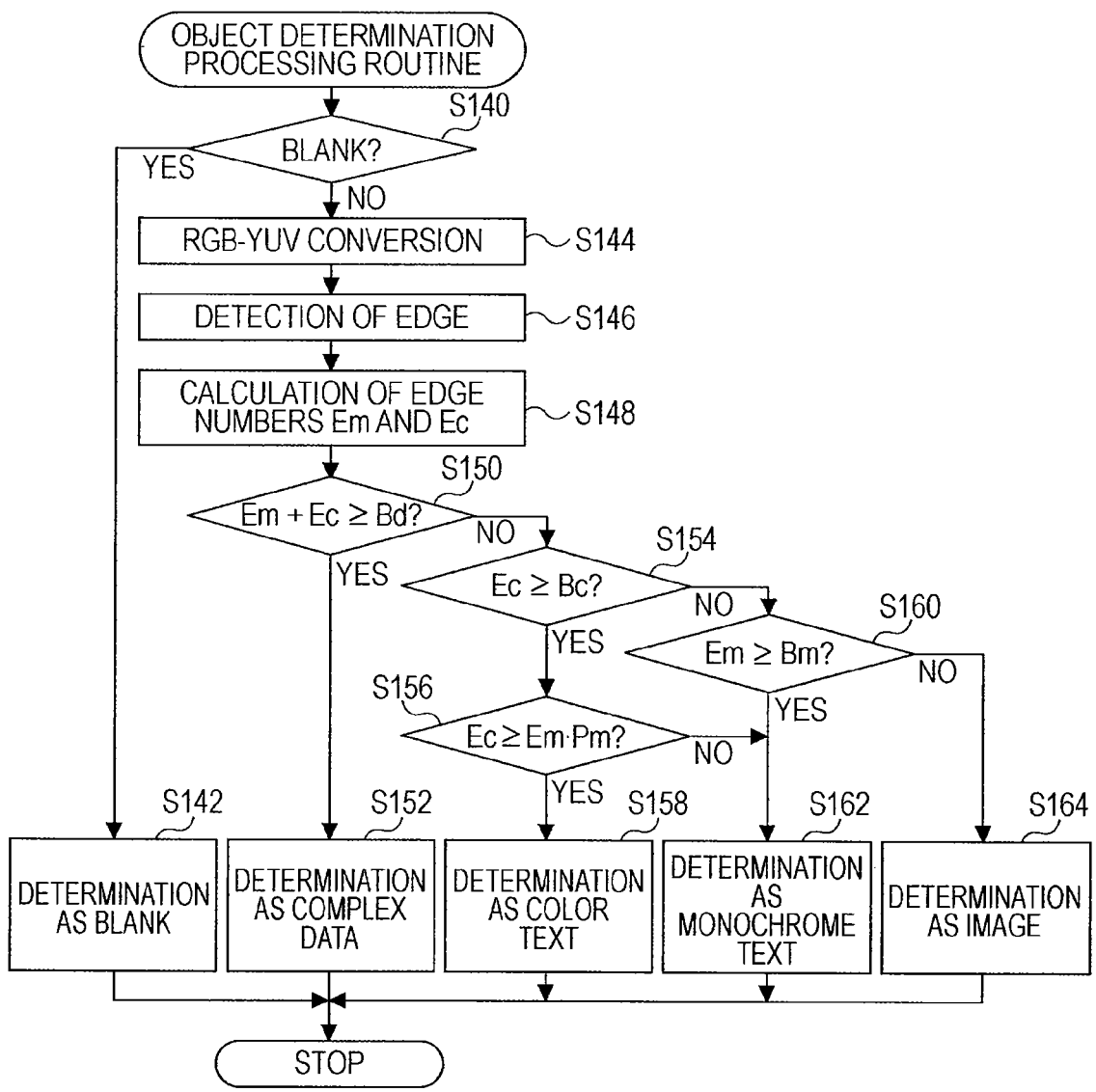
FIG. 4 is a flow chart illustrating an example of an object determination processing routine.
FIG. 5 is an explanatory view illustrating an example of a filter for edge detection.

In the object determination processing of FIG. 4, first, it is determined whether or not all pixels in a block are white on the basis of a pixel value of RGB of image data (step S140). If it is determined that all pixels in the block are white, the block is determined to be a blank block (step S142), and the routine is completed. If it is determined that all pixels in the block are not white, a color system of image data in the block is converted from RGB into YUV which is the combination of a brightness signal Y, and a difference U between the brightness signal and a blue component, and a difference V between the brightness signal and a red component (step S144), and an edge in the block is detected by applying a filter for each of the YUV components (step S146). An example of the filter is shown in FIG. 5. As shown in the drawing, edge detection is performed by multiplying nine pixel values, which are positioned at the left, right, upper, and lower sides of a noted pixel on the center, by a filter coefficient and comparing one obtained by adding the results with a threshold value using a filter based on a second differential system, such as a Laplacian filter. In addition, it is needless to say that a filter to be applied is not limited to the filter based on the second differential system, and a filter based on a first differential system, such as a Sobel filter or a Prewitt filter, may also be used. Then, a monochrome edge number Em and a color edge number Ec are calculated by counting the number of detected edges (step S148). Here, the monochrome edge number Em is calculated as the number of Y-component edges in a block, and the color edge number Ec is calculated as the sum of the number of U-component edges and the number of V-component edges in the block. Then, a sum of the monochrome edge number Em and the color edge number Ec is compared with a threshold value Bd (step S150). When the sum of the monochrome edge number Em and the color edge number Ec is equal to or larger than the threshold value Bd, a determination as complex data, such as a line image in which most of the block is configured by edge elements, is made regardless of a color edge or a monochrome edge (step S152), completing the routine. Here, the threshold value Bd is a threshold value for determining the complex data described above. For example, 60 or 62 is set beforehand as the threshold value Bd for one block of 8×8. When the sum of the monochrome edge number Em and the color edge number Ec is less than the threshold value Bd, it is determined that the image data is not complex data. Then, it is determined whether or not the color edge number Ec is equal to or larger than the threshold value Bc (step S154), and then it is determined whether or not the color edge number Ec is equal to or larger than one obtained by multiplying the monochrome edge number Em by a priority coefficient Pm (step S156). Here, the threshold value Bc is a threshold value for determining whether or not a color text is included in a block. For example, 1 or 2 is set as the threshold value Bc for one block. In addition, the priority coefficient Pm is a priority coefficient for giving a priority to a monochrome text over a color text in determination when the color text and the monochrome text are present together in a block. For example, a value of 3 or 4 is set as the priority coefficient Pm. When the color edge number Ec is equal to or larger than the threshold value Bc and the color edge number Ec is equal to or larger than one obtained by multiplying the monochrome edge number Em by the priority coefficient Pm, the image data in the block is determined to be a color text (step S158), and the routine is completed. If it is determined that the color edge number Ec is less than one obtained by multiplying the monochrome edge number Em by the priority coefficient Pm even if the color edge number Ec is equal to or larger than the threshold value Bc, the image data in the block is determined to be a monochrome text (step S162), and the routine is completed. When the color edge number Ec is determined to be less than the threshold value Bc, the monochrome edge number Em is compared with the threshold value Bm (step S160). If the monochrome edge number Em is larger than the threshold value Bm, the image data in the block is determined to be a monochrome text (step S162). If the monochrome edge number Em is less than the threshold value Bm, the image data in the block is determined to be image data, such as a photograph, since there are few color edge elements and monochrome edge elements in the block, (step S164), and the routine is completed. Here, the threshold value Bm is a threshold value for determining whether or not a monochrome text is included in a block. For example, a value of 9 or 10 is set as the threshold value Bm. Specifically, the threshold values Bd, Bc, and Bm and the priority coefficient Pm are determined on the basis of a method of an image sensor of the scanner unit 30. For example, in the CIS (contact image sensor) method, the threshold values Bd, Bc, and Bm are set to larger values than those in a CCD (charge coupled device) method since edge detection tends to be easy in the CIS method. In addition, in the CIS method, the coefficient Pm is also set to a larger value than that in the CCD method since a color edge tends to be intense compared with the CCD method. Heretofore, the object determination processing has been described.

Figure 6:
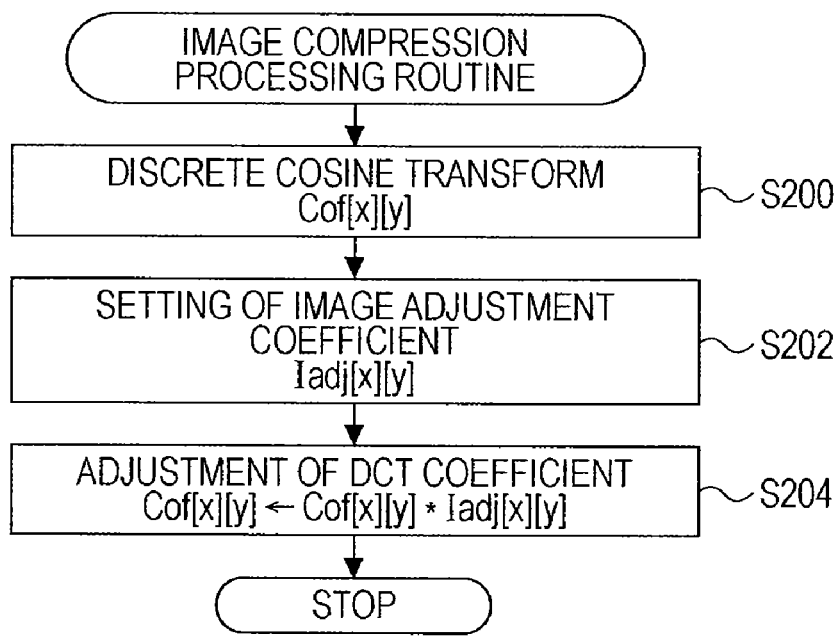
FIG. 6 is a flow chart illustrating an example of an image compression processing routine.

The processing routine in copy mode returns to step S106 in which the type of image data in a block is determined as described above. On the basis of the determination result (step S108), blank compression processing is executed when the image data in an object block is blank (step S110), complex data compression processing is executed when the image data in the object block is complex data (step S112), text compression processing is executed when the image data in the object block is text data (step S114), and image compression processing is executed when the image data in the object block is image data (step S116). Here, the blank compression processing is performed by executing a blank compression processing routine (not shown). Specifically, the blank compression processing can be performed by replacing component values of the YUV components in the block with fixed data that means blank. In addition, compressed blank data is stored in the RAM 66 (step S122). In addition, the complex data compression processing is performed by executing a complex data compression processing routine, the text compression processing is performed by executing a text compression processing routine, and the image compression processing is performed by executing an image compression processing routine. For the convenience of explanation, the image compression processing routine and the complex data compression processing routine will be described first, and then the text compression processing routine will be described. FIG. 6 is a flow chart illustrating an example of the image compression processing routine executed by the main controller 60, and FIG. 7 is a flow chart illustrating an example of the complex data compression processing routine executed by the main controller 60.

In the image compression processing routine shown in FIG. 6, first, component values of YUV components of image data in an object block are converted into DCT coefficient Cof[x] [y] (x and y are index values of 0 to 7 since one block is configured to include 8×8 pixels) using discrete cosine transform (DCT) (step S200). Here, the DCT is processing for conversion into data indicating an occurrence frequency of total 64 frequency components from a low frequency to a high frequency, which are obtained by DCT, as an amount of energy since one block is configured to include 8×8 pixels in the present embodiment. Then, an image adjustment coefficient Iadj[x][y] is set as an adjustment coefficient for adjusting a DCT coefficient (step S202), one obtained by multiplying the DCT coefficient Cof[x][y] by the image adjustment coefficient Iadj[x][y] is set as a new DCT coefficient Cof[x][y] for all combinations of the index values x and y (step S204), and the routine is completed. An example of the image adjustment coefficient is shown in FIG. 8. For the image adjustment coefficient, either a value 1 or a value 0 is set for each frequency component as shown in the drawing, and a DCT coefficient of a frequency component for which the value 1 is set is maintained and a DCT coefficient of a frequency component for which the value 0 is set is cut as an unnecessary component. In the present embodiment, the image adjustment coefficient is set such that a DCT coefficient of a high-frequency component is cut to a large extent, since it is thought that a degree of color change between adjacent pixels is small in the case of an image, such as a photograph, and there is little influence on the image quality even if a high-frequency component is removed.

Figure 7:
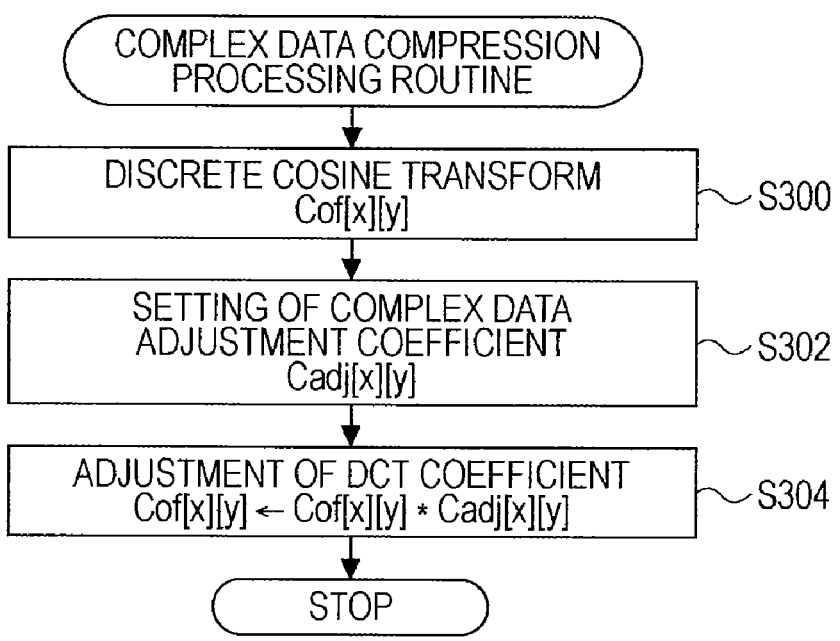
FIG. 7 is a flow chart illustrating an example of a complex data compression processing routine.

In the complex data compression processing routine shown in FIG. 7, component values of the YUV components of image data are converted into the DCT coefficient Cof[x][y] using the discrete cosine transform described above (step S300), a complex data adjustment coefficient Cadj[x][y] is set as an adjustment coefficient for adjusting the DCT coefficient (step S302), one obtained by multiplying the DCT coefficient Cof[x][y] by the complex data adjustment coefficient Cadj[x][y] is set as a new DCT coefficient Cof[x][y] for all combinations of the index values x and y (step S304), and the routine is completed. An example of the complex data adjustment coefficient is shown in FIG. 9. For the complex data adjustment coefficient, either a value 1 or a value 0 is set for each frequency component as shown in the drawing, and a DCT coefficient of a frequency component for which the value 1 is set is maintained and a DCT coefficient of a frequency component for which the value 0 is set is cut as an unnecessary component. For complex data, since most of the block is formed by edge elements as described above, it is preferable to make all high-frequency components left in order to secure the image quality of a fine line of the complex data. In this case, however, the amount of data increases. Therefore, the amount of data is made not to be too large by making a high-frequency component left compared with the image compression processing routine but cutting high-frequency components equal to or larger than a predetermined value uniformly.

Figure 10:
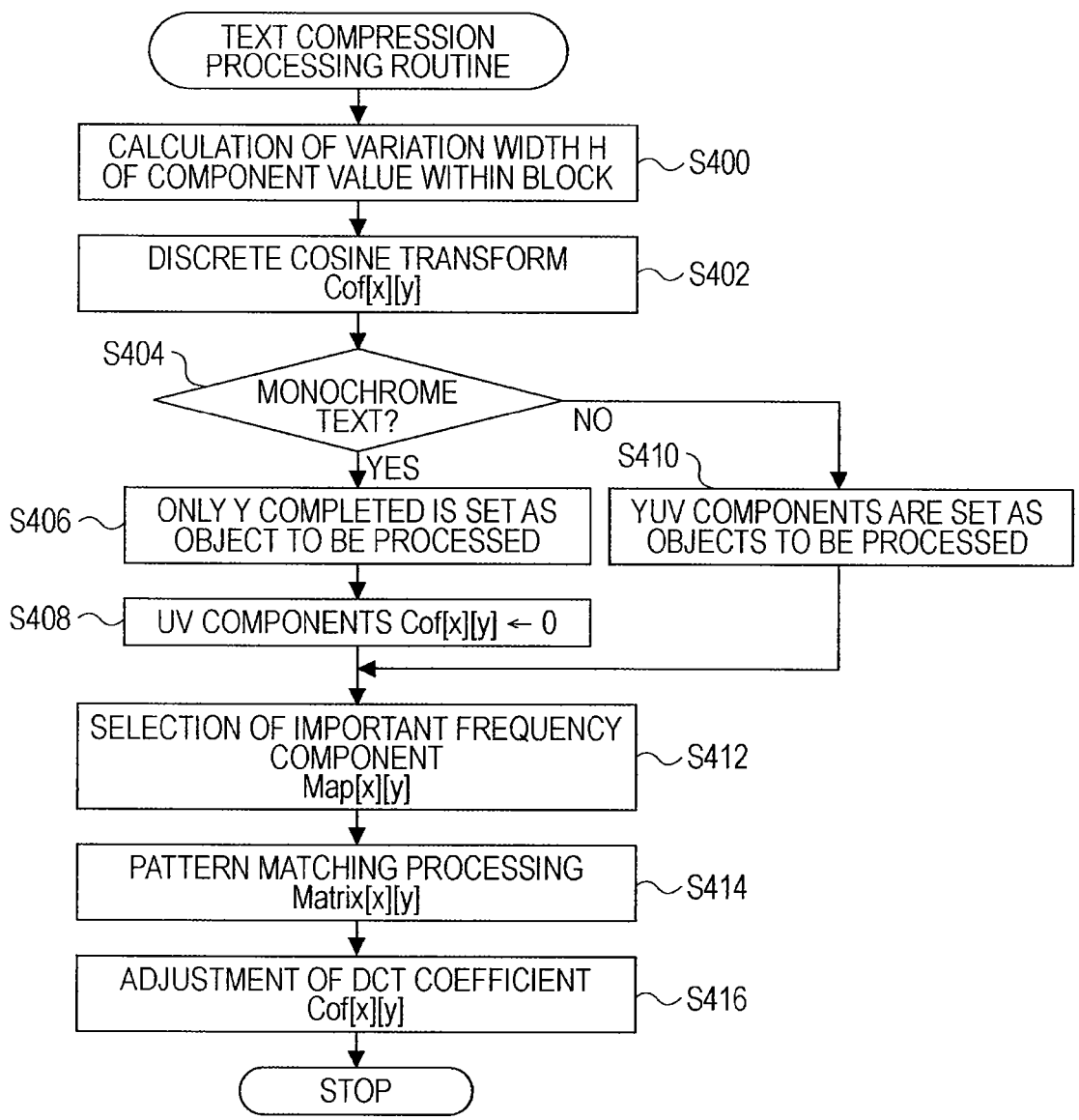
FIG. 10 is a flow chart illustrating an example of a text compression processing routine.

Next, the text compression processing routine will be described. FIG. 10 is a flow chart illustrating an example of the text compression processing routine executed by the main controller 60. In the text compression processing routine, first, a variation width H of component values of the YUV components in a block are calculated (step S400), and the component values of the YUV components of image data in the block are converted into the DCT coefficient Cof[x][y] using the discrete cosine transform described above (step S402). Here, one calculated as a difference between maximum and minimum values of the component values of the YUV components may be used as the variation width H. Subsequently, it is determined whether or not the image data in the block is a monochrome text (step S404). If it is determined the image data in the block is a monochrome text, only a Y component of YUV components of the image data is set as an object to be processed in steps S412 to S416 which will be described later (step S406), and the DCT coefficient Cof[x][y] is set to the value 0 for the UV components, that is, all frequency components are cut for the UV components (step S408). If it is determined that the image data in the block is not a monochrome text, that is, the image data in the block is a color text, all of the YUV components of the image data are set as object to be processed in steps S412 to S416 (step S410). Moreover, even though all frequency components are cut for the UV components when the image data is determined to be a monochrome text in the present embodiment, some low-frequency components may be held without being cut. Then, an important frequency component Map[x][y] for the converted DCT coefficient Cof[x][y] is selected (step S412). Here, selection of the important frequency component is performed by executing an important frequency component selection processing routine illustrated in FIG. 11. Here, the explanation on the text compression processing routine is stopped, and the important frequency component selection processing routine will be described.

Figure 11:
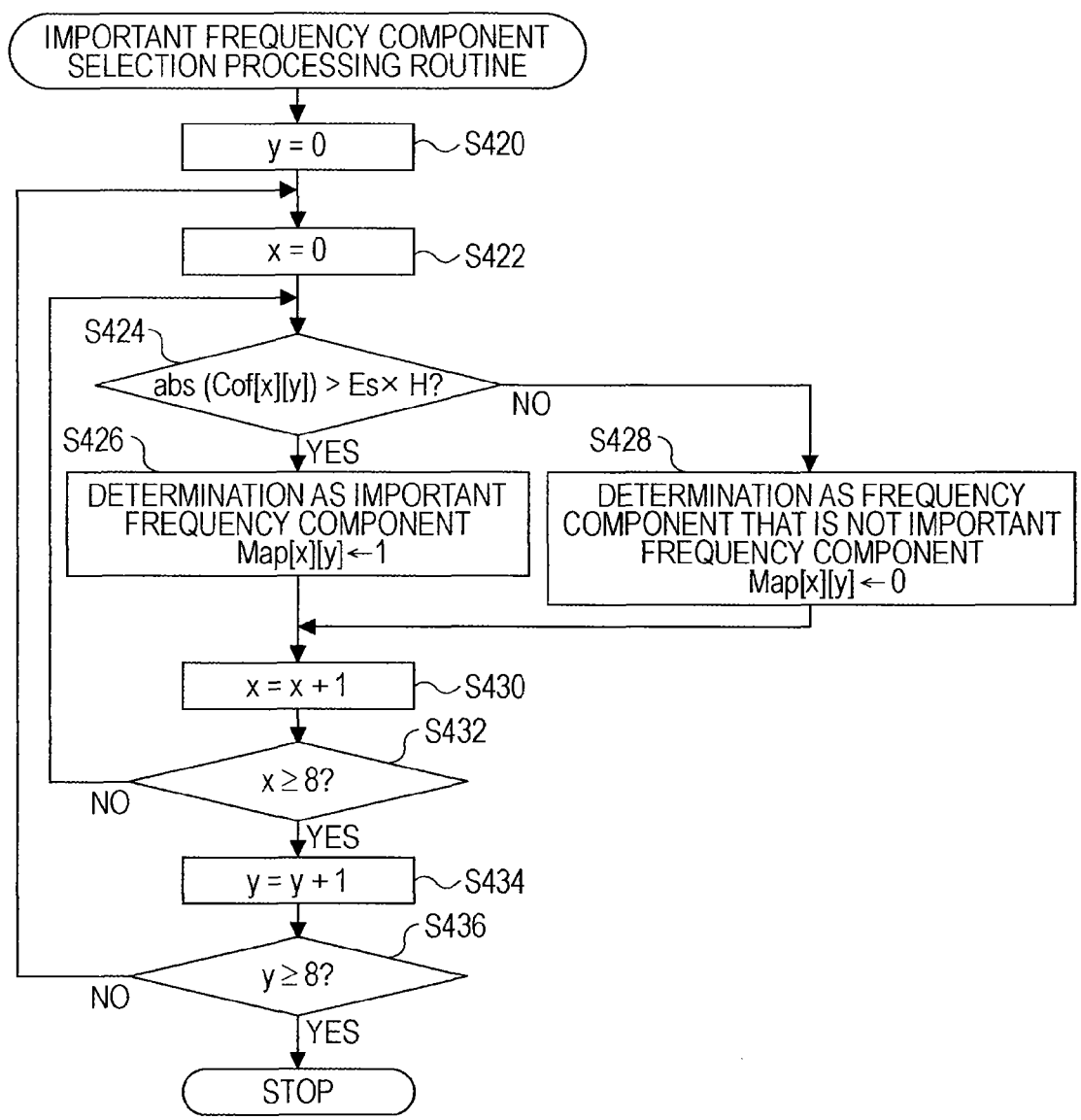
FIG. 11 is a flow chart illustrating an example of an important frequency component selection processing routine.

In the important frequency component selection processing routine shown in FIG. 11, first, the index value y is set as a value 0 (step S420) and the index value x is set as a value 0 (step S422). Then, an absolute value abs(Cof[x][y]) of the DCT coefficient in the index values x and y is compared with one (Es×H) obtained by multiplying a coefficient Es by the variation width H (step S424). When the absolute value abs (Cof[x][y]) of the DCT coefficient is larger than the one obtained by multiplying the coefficient Es by the variation width H, a determination as an important frequency component is made to set the important frequency component Map[x][y] to the value 1 (step S426). When the absolute value abs(Cof[x][y]) of the DCT coefficient is equal to or smaller than the one obtained by multiplying the coefficient Es by the variation width H, it is determined not to be an important frequency component to set the important frequency component Map[x][y] to the value 0 (step S428). Here, the coefficient Es is a coefficient for determining whether or not it is an important frequency component. For example, a value 1.0 or a value 1.2 is set as the coefficient Es. In addition, a determination of an important frequency component using the variation width H of YUV components is based on admitting that the variation width H is related with the amplitude of a frequency when the YUV components are converted into frequency components. Then, the index value x is incremented by a value 1 (step S430), and the process returns to step S424 until the index value x is less than a value 8 and processing of steps S424 to S430 is repeated (step S432). When the index value x becomes equal to or larger than the value 8, the index value y is incremented by a value 1 (step S434), and the process returns to step S422 until the index value y is equal to or larger than the value 8 and processing of steps S422 to S434 is repeated (step S436), completing the routine.

Figure 12:
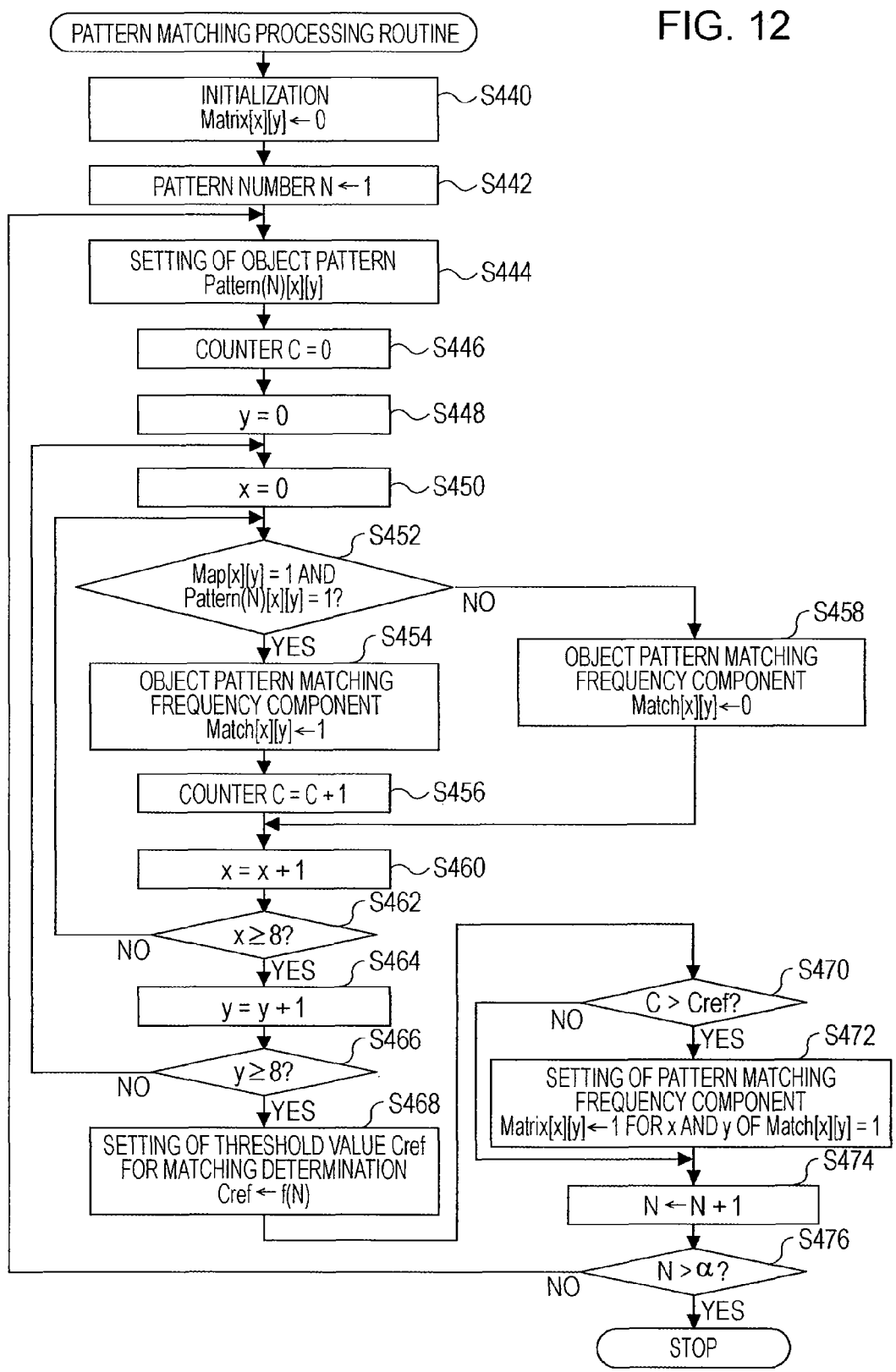
FIG. 12 is a flow chart illustrating an example of a pattern matching processing routine.
Figure 13:
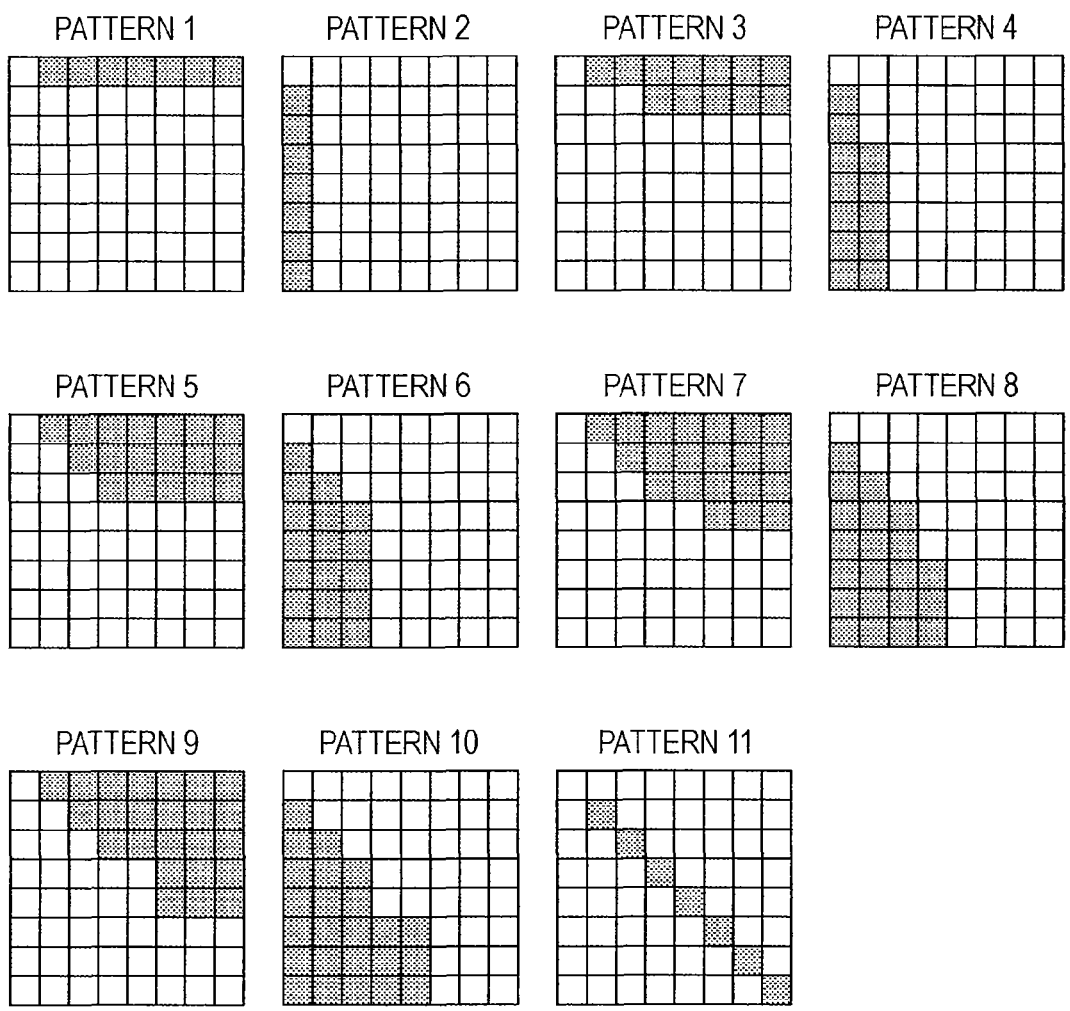
FIG. 13 is a flow chart illustrating example of a pattern used in pattern matching.
Figure 14:
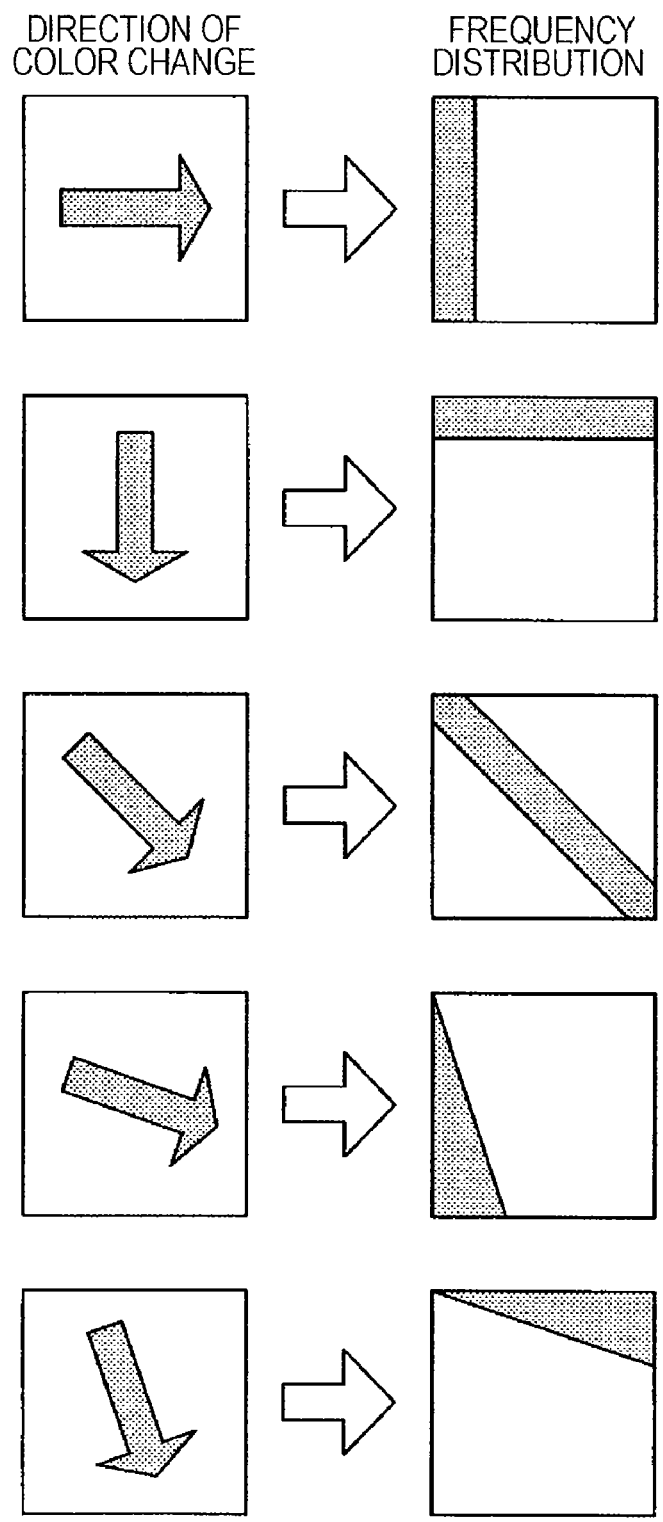
FIG. 14 is an explanatory view illustrating the relationship between the direction of a color change of an image and frequency distribution.

When the process returns to step S408 of the text compression processing routine to select the important frequency component Map[x][y], a pattern matching frequency component Matrix[x][y] is set by performing pattern matching by comparing the selected important frequency component Map[x][y] with an object pattern (step S414). The pattern matching processing is performed by executing a pattern matching processing routine illustrated in FIG. 12. In the pattern matching processing routine of FIG. 12, for all of the index values x and y, the pattern matching frequency component Matrix[x][y] is set to a value 0 for initialization (step S440), a pattern number N is set to a value 1 (step S442), and a pattern Pattern(N)[x][y] of the set pattern number N is set as an object pattern (step S444). Examples of a pattern used in pattern matching are shown in FIG. 13, and examples of the relationship between the frequency distribution of a pattern and the direction of a color change of an original image are shown in FIG. 14. As shown in the drawing, total eleven patterns of 1 to 11 having different frequency distribution for every pattern are prepared. Each pattern corresponds to the direction of the color change of an original image. Accordingly, the direction in which an edge of a text is formed can be known by checking the frequency distribution of an image. Subsequently, a counter C is set to a value 0 (step S446), the index value y is set to a value 0 (step S448), the index value x is set to a value 0 (step S450), and pattern matching is performed by determining whether or not the important frequency component Map[x][y] is a value 1 and the pattern Pattern(N)[x][y] is a value 1 for the index values x and y (step S452). When the important frequency component Map[x][y] is a value 1 and the pattern Pattern(N)[x][y] is a value 1, it is determined that the important frequency component is included within a range of frequency distribution of an object pattern, and the object pattern matching frequency component Match[x][y] is set to a value 1 (step S454) and the counter C is incremented by the value 1 (step S456). When the important frequency component Map[x][y] is a value 0 and the pattern Pattern(N)[x][y] is a value 0, it is determined that the important frequency component is not included within the range of the frequency distribution of the object pattern, and the object pattern matching frequency component Match[x][y] is set to a value 0 (step S458). Then, the index value x is incremented by a value 1 (step S460), and the process returns to step S452 until the index value x is less than a value 8 and processing of steps S452 to S464 is repeated (step S462). When the index value x becomes equal to or larger than the value 8, the index value y is incremented by a value 1 (step S464), and the process returns to step S450 until the index value y is equal to or larger than the value 8 and processing of steps S450 to S464 is repeated (step S466), completing the routine. Then, a threshold value Cref for matching determination is set on the basis of the pattern number N (step S468), and it is determined whether or not the value of the counter C is equal to or larger than the threshold value Cref for matching determination (step S470). The threshold value Cref for matching determination is a threshold value for determining whether or not the distribution of important frequency components and the object pattern match each other. In the present embodiment, the relationship between the pattern number N and the threshold value Cref for matching determination is set beforehand and is stored as a map in the ROM 64, such that the corresponding threshold value Cref for matching determination is extracted and set from the stored map when the pattern number N is given. An example of the map is shown in FIG. 15. When the threshold value Cref for matching determination is set, the value of the counter C is compared with the threshold value Cref for matching determination (step S470). When the value of the counter C is larger than the threshold value Cref for matching determination, it is determined that the distribution of important frequency components matches an object pattern, and the pattern matching frequency component Matrix[x][y] is set to a value 1 for all of the index values x and y whose object pattern matching frequency component Match[x][y] is a value 1 (step S472). When the value of the counter C is equal to or smaller than the threshold value Cref for matching determination, it is determined that the distribution of important frequency components does not match the object pattern, the process proceeds to the next processing without performing any processing. Then, the pattern number N is incremented by the value 1 (step S474). Then, until the last number α (11 in the present embodiment) of the patterns prepared by the pattern number N is exceeded (step S476), the process returns to step S444 to set a pattern of the pattern number N incremented by the value 1 as an object pattern and repeatedly execute the processing of steps S446 to S474. When the pattern number N exceeds the number α, the routine is completed. In addition, as can be seen from the processing of steps S444 to S476, the distribution of all object patterns to match is reflected on the pattern matching frequency Matrix[x][y] when the important frequency component matches a plurality of object patterns. It is needless to say that one of the object patterns having a largest number of important frequency components distributed may be determined on the basis of the value of the counter C and the object pattern matching frequency Match[x][y] of the determined pattern may be set as the pattern matching frequency Matrix[x][y].

Figure 16:
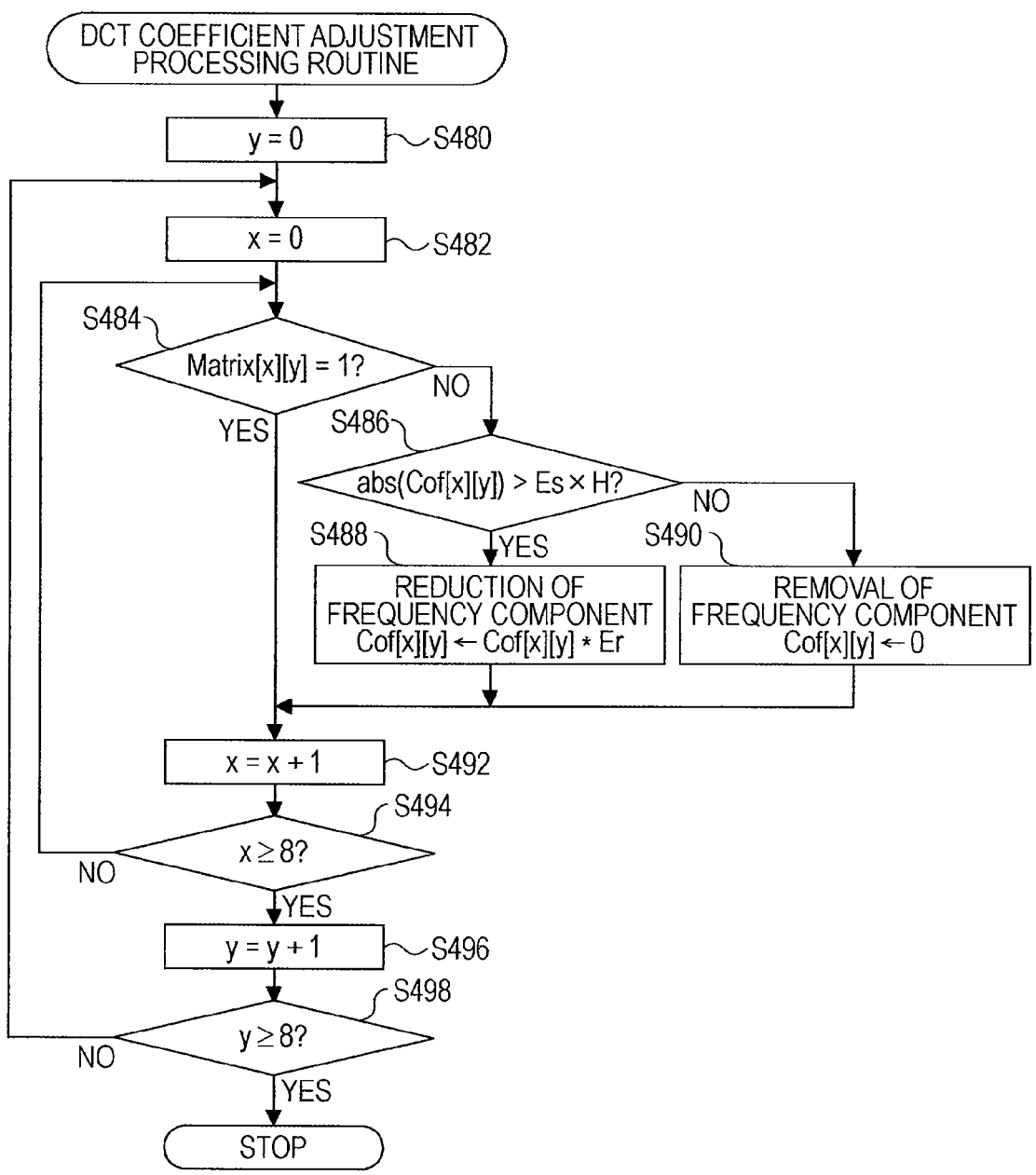
FIG. 16 is a flow chart illustrating an example of a DCT coefficient adjustment processing routine.
Figure 17A:
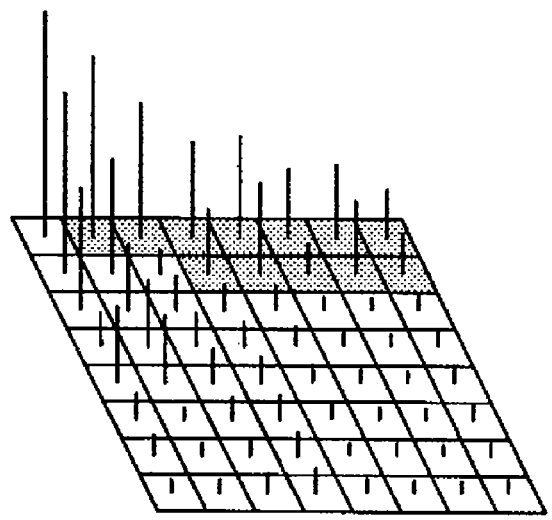
FIGS. 17A and 17B are explanatory views illustrating absolute values of DCT coefficients before and after adjustment.
Figure 17B:
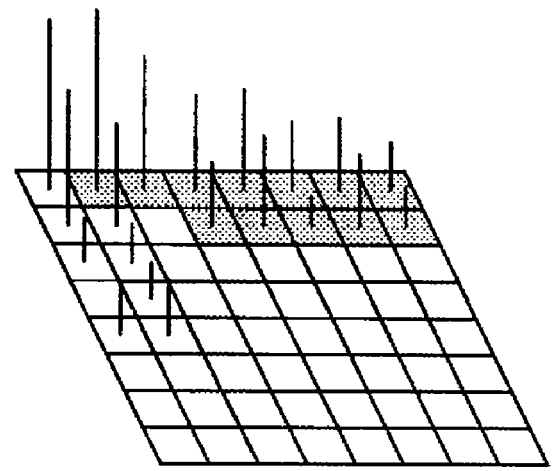

When the pattern matching frequency Matrix[x][y] is set by performing the pattern matching as described above, the DCT coefficient Cof[x][y] is adjusted on the basis of the value of the pattern matching frequency Matrix[x][y] (step S416), and the routine is completed. Adjustment of a DCT coefficient is performed by executing a DCT coefficient adjustment processing routine illustrated in FIG. 16. In the DCT coefficient adjustment processing routine, the index value y is set to a value 0 first (step S480), the index value x is set to a value 0 (step S482), and it is determined whether or not the pattern matching frequency Matrix[x][y] is a value 1 for the index values x and y (step S484). When the pattern matching frequency Matrix[x][y] is a value 1, the process proceeds to next processing while maintaining the DCT coefficient Cof[x][y] in the index values x and y. When the pattern matching frequency Matrix[x][y] is a value 0, the absolute value abs(Cof[x][y]) of the DCT coefficient is compared with one obtained by multiplying the variation width H by the coefficient Es (step S486). When the absolute value abs(Cof[x][y]) of the DCT coefficient is larger than the one obtained by multiplying the variation width H by the coefficient Es, it is determined that the frequency component is a frequency component having an influence in determining the image quality of an image to some extent even though the frequency component is basically an unnecessary component, and the frequency component is reduced by multiplying the DCT coefficient Cof[x][y] in the index values x and y by a coefficient Er to thereby set a new DCT coefficient Cof[x][y] (step S488). When the absolute value abs(Cof[x][y]) of the DCT coefficient is equal to or smaller than the one obtained by multiplying the variation width H by the coefficient Es, the DCT coefficient Cof[x][y] in the index values x and y is set to the value 0 (step S490). Here, the coefficient Er is a coefficient for reducing a frequency component. For example, a value 0.8 or a value 0.7 is set as the coefficient Er. Then, the index value x is incremented by a value 1 (step S492), and the process returns to step S484 until the index value x is less than a value 8 and processing of steps S484 to S492 is repeated (step S494). When the index value x becomes equal to or larger than the value 8, the index value y is incremented by a value 1 (step S496), and the process returns to step S482 until the index value y is equal to or larger than the value 8 and processing of steps S482 to S496 is repeated (step S498), completing the routine. Examples of the DCT coefficient Cof[x][y] before and after the adjustment using the pattern matching frequency Matrix[x][y] are shown in FIGS. 17A and 17B. As shown in the drawing, it is understood that the DCT coefficient Cof[x][y] is maintained for a component existing within a range of the frequency distribution to be subjected to pattern matching, but the DCT coefficient Cof[x][y] is effectively cut for a component out of the range. Heretofore, the text compression processing routine has been described.

Returning to the processing routine in copy mode to adjust a DCT coefficient according to the type of image data as described above, quantization processing is performed (step S118), entropy coding processing, such as Huffman coding, is performed (step S120), and obtained coded data is stored in the RAM 66 (step S122). Here, a quantization table used in quantization processing is created such that each frequency component is not cut to a large extent in the present embodiment, since compression of image data is performed by adjusting a DCT coefficient. Then, it is determined whether or not a next unprocessed block exists (step S124). When the next unprocessed block exists, the process returns to step S104 and processing of steps S104 to S122 is repeated. When the next unprocessed block does not exist, it is determined whether or not a next line to be scanned exists (step S126). When a next line to be scanned exists, the process returns to step S100 and processing of steps S100 to S124 is repeated. When the next line does not exist, the coded data stored in the RAM 66 is expanded in a band unit to generate image data (step S128), printing processing is executed on the basis of the image data generated by outputting a print command to the printer unit 20 (step S130), and the routine is completed. In addition, it is preferable to execute the expansion of coded data in a reverse procedure to the procedure of converting image data into coded data, that is, in the order of entropy decoding processing, reverse quantization processing, and inverse discrete cosine transform.

Here, the correspondence relationship between constituent components of the present embodiment and constituent components of the invention will be clarified. The main controller 60 that executes processing of step S102 of the processing routine in copy mode shown in FIG. 3 of the present embodiment is equivalent to an image dividing unit of the invention. The main controller 60 that executes processing (object determination processing routine shown in FIG. 4) of step S106 of the processing routine in copy mode is equivalent to an image type determining unit. The main controller 60 that executes step S200 of the image compression processing routine shown in FIG. 6, step S300 of the complex data compression processing routine shown in FIG. 7, and step S410 of the text compression processing shown in FIG. 10 is equivalent to a frequency component conversion unit. The main controller 60 that executes processing of steps S110 and S120 of the processing routine in copy mode is equivalent to an image compression unit. Moreover, in the present embodiment, an example of the image processing method of the invention is also clarified by describing the operation of the multifunction printer 10.

In the multifunction printer 10 of according to the present embodiment described above, image data is divided into a plurality of blocks, the image data is determined for each block such that complex data, a color text, a monochrome text, and an image are distinguished from each other, and an unnecessary component of the DCT coefficients Cof[x][y] obtained by converting color components of the image data into frequency components is changed and removed on the basis of the type of the image data determined. Therefore, the compression rate can be raised while maintaining the satisfactory image quality regardless of the type of image data. As a result, the capacity of the RAM 66 can be made small. In addition, the processing can be simplified since it is sufficient only to adjust the DCT coefficient Cof[x][y] according to the type of image data.

Furthermore, in the multifunction printer 10 according to the present embodiment, when image data is determined to be text data, the direction of an edge of a text is determined and a frequency component distributed in the direction of the edge is left and the other components are removed as unnecessary components. Therefore, the compression rate can be raised while maintaining the image quality of the text. In addition, since the direction of an edge is determined by using pattern matching, the direction of the edge can be determined by simple processing. In addition, since a component considered to have a relatively large DCT coefficient and have an effect on the image quality even though the component is not a frequency component distributed in the direction of an edge is not completely removed but is reduced, the image quality of a text can be further improved.

Furthermore, in the multifunction printer 10 according to the present embodiment, when all pixels of image data are white blank data, a color component value of the image data is converted into fixed data meaning the blank and is then stored. Therefore, the compression rate can be further raised. Moreover, in this case, since a determination for distinguishing complex data, a color text, a monochrome text, and an image is not performed, the processing speed can be raised.

In the present embodiment, image data is divided into 8×8 pixels to form one block. However, one block may be made to have any size by dividing image data into 4×4 pixels or 16×16 pixels, for example.

In the present embodiment, the RGB color system is converted into the YUV color system and the compression processing is performed by using a YUV component value. However, the invention is not limited thereto, but other color systems, such as the RGB color coordinates and a CMYK color system, may also be used.

In the present embodiment, it is determined whether or not all pixels of image data in a block are white and then the blank compression processing is executed. However, such processing may be omitted.

In the present embodiment, the type of image data is determined by distinguishing complex data, a color text, a monochrome text, and an image from each other. However, some distinction may be omitted as long as the type of image data is determined by distinguishing two of those described above. For example, color and monochrome may not be distinguished for text data.

In the present embodiment, when the color edge number Ec is not equal to or larger than one obtained by multiplying the monochrome edge number Em by the monochrome text priority coefficient Pm and the monochrome edge number Em is equal to or larger than the threshold value Bm even if the color edge number Ec is equal to or larger than the threshold value Bc in the object determination processing routine shown in FIG. 4, a determination as a monochrome text is made such that the monochrome text is prioritized over a color text. However, a determination may be made such that a color text is prioritized over a monochrome text depending on the specification of the scanner unit 30, or the priority may not be applied.

In the present embodiment, compression of image data is performed by adjusting a DCT coefficient obtained by converting color components of image data into frequency components using the discrete cosine transform (DCT). However, the invention is not limited to using the discrete cosine transform, but any kind of method, such as wavelet transform or lapped orthogonal transform (LOT), may also be used as long as color components of image data can be converted into frequency components and the analysis is possible.

In the present embodiment, in the pattern matching processing when image data is determined to be a text, some frequency components not matching a pattern among the DCT coefficients Cof[x][y] obtained by converting color components of image data into frequency components are stored according to the size of the absolute value abs(Cof[x][y]) of the DCT coefficient. However, the frequency components may be completely removed as a value 0.

In the present embodiment, a case in which the image processing device according to the embodiment of the invention is applied to the operation in the copy mode has been described. However, the image processing device according to the embodiment of the invention may also be applied to an operation in a memory card mode in which image data obtained by scanning the document P is compressed and the image data is stored in the memory card 42.

In the present embodiment, a case in which the image processing device according to the embodiment of the invention is applied to the multifunction printer 10 that includes the printer unit 20 and the scanner unit 30 so that copy is possible has been described. However, the image processing device according to the embodiment of the invention may be applied to a scanner device including only a scanner unit, or may be applied to an image input device, such as a digital camera or a camera-mounted mobile phone that performs compression processing on an image that has been imaged. In addition, the invention may be realized in the form of an image processing method or a program.

While the embodiment of the invention has been described, the invention is not limited to the embodiment, but various modifications may be made without departing from the technical scope of the invention.

What is claimed is:

1. An image processing method for compressing an image, the method comprising:
   receiving input image data, the image data including color components;
   dividing the input image data into a plurality of blocks, each block including edge elements;
   determining type of the input image data for each block based on a number of edge elements of each block; and
   compressing each block based on the type of input image data, wherein compressing includes converting the color components into frequency components, identifying unnecessary frequency components, and suppressing or removing unnecessary frequency components.

2. The method of claim 1, wherein determining the type of the input image data includes counting edge elements to calculate monochrome edge elements and color edge elements, and comparing the sum of monochrome edge elements and color edge elements to a predetermined value.

3. The method of claim 1, wherein the blocks are derived from text, and compressing includes a text adjustment operation which determines directions of edge components through a pattern matching operation and removes unnecessary frequency components based on directions of edge components.

4. The method of claim 3, wherein the text is determined to be monochrome text, and only brightness components of the color components are converted into frequency components for each monochrome text block.

5. The method of claim 1, wherein the blocks are derived from blank data, and compressing includes a blank adjustment operation which replaces the color components with fixed data.

6. The method of claim 5, wherein blank data includes pixels which are white.

7. The method of claim 1, wherein converting the color components into frequency components is performed by applying a discrete cosine transform to each color component which converts the color components into discrete cosine coefficients.

8. The method of claim 7, wherein suppressing or removing unnecessary frequency components is performed by applying image adjustment coefficients to the discrete cosine coefficients.

9. The method of claim 8, wherein each unnecessary frequency component is identified by comparing an absolute value of a discrete cosine coefficient with a product of a predetermined frequency coefficient and a variation width of a respective color component.

10. The method of claim 9, wherein an unnecessary frequency component has an absolute value of a discrete cosine coefficient which is less than or equal to the product of the predetermined frequency coefficient and the variation width.

11. An image processing device for compressing an image, the device comprising:
    a bus; and
    a main controller coupled to the bus, the main controller for storing and executing a method comprising:
    receiving input image data, the image data including color components;
    dividing the input image data into a plurality of blocks, each block including edge elements;
    determining a type of the input image data for each block based on a number of edge elements of each block; and
    compressing each block based on the type of input image data, wherein compressing includes converting the color components into frequency components, identifying unnecessary frequency components, and suppressing or removing unnecessary frequency components.

12. The device of claim 11, wherein determining the type of the input image data includes counting edge elements to calculate monochrome edge elements and color edge elements, and comparing the sum of monochrome edge elements and color edge elements to a predetermined value.

13. The device of claim 11, wherein the blocks are derived from text, and compressing includes a text adjustment operation which determines directions of edge components through a pattern matching operation and removes unnecessary frequency components based on directions of edge components.

14. The device of claim 13, wherein the text is determined to be monochrome text, and only brightness components of the color components are converted into frequency components for each monochrome text derived block.

15. The device of claim 11, wherein the blocks are derived from blank data, and compressing includes a blank adjustment operation which replaces the color components with fixed data.

16. The device of claim 15, wherein blank data includes pixels which are white.

17. The device of claim 11, wherein converting the color components into frequency components is performed by applying a discrete cosine transform to each color component which converts the color components into discrete cosine coefficients.

18. The device of claim 11, wherein suppressing or removing unnecessary frequency components is performed by applying image adjustment coefficients to the discrete cosine coefficients.

19. The device of claim 18, wherein each unnecessary frequency component is identified by comparing an absolute value of a discrete cosine coefficient with a product of a predetermined frequency coefficient and a variation width of a respective color component.

20. The device of claim 19, wherein an unnecessary frequency component has an absolute value of a discrete cosine coefficient which is less than or equal to the product of the predetermined frequency coefficient and the variation width.

* * * * *